(12) United States Patent
Vera Villares et al.

(10) Patent No.: US 8,943,666 B2
(45) Date of Patent: Feb. 3, 2015

(54) METHOD FOR ASSEMBLING FUSELAGE SECTIONS OF AN AIRCRAFT

(75) Inventors: Enrique Vera Villares, Getafe (ES); Maria Aranzazu Garcia Patino, Madrid (ES)

(73) Assignee: Airbus Operations, S.L., Getafe (ES)

( * ) Notice: Subject to any disclaimer, the term of this patent is extended or adjusted under 35 U.S.C. 154(b) by 120 days.

(21) Appl. No.: 13/357,238

(22) Filed: Jan. 24, 2012

(65) Prior Publication Data

US 2012/0186062 A1  Jul. 26, 2012

Related U.S. Application Data

(63) Continuation of application No. PCT/ES2010/070379, filed on Jun. 8, 2010.

(30) Foreign Application Priority Data

Jul. 24, 2009 (ES) .................................. 200930503

(51) Int. Cl.
  *B23P 21/00* (2006.01)
  *B64C 1/06* (2006.01)
  *B64C 1/00* (2006.01)

(52) U.S. Cl.
  CPC ......... *B64C 1/069* (2013.01); *B64C 2001/0081* (2013.01); *B64C 2001/0072* (2013.01); *Y02T 50/433* (2013.01); *Y02T 50/43* (2013.01)
  USPC ........................................... 29/469; 244/120

(58) Field of Classification Search
  CPC ............ B64C 2001/0072; B64C 1/069; B64C 2001/0081; Y02T 50/43; Y02T 50/433
  USPC ............................................ 29/469; 244/120
  See application file for complete search history.

(56) References Cited

U.S. PATENT DOCUMENTS

| 6,328,261 | B1 * | 12/2001 | Wollaston et al. | 244/132 |
| 6,408,517 | B1 * | 6/2002 | Lehmker et al. | 29/897.2 |
| 7,159,822 | B2 * | 1/2007 | Grantham et al. | 244/119 |
| 8,453,975 | B2 * | 6/2013 | Dietrich et al. | 244/132 |
| 2006/0060705 | A1 | 3/2006 | Stulc et al. | |

FOREIGN PATENT DOCUMENTS

| EP | 1 063 166 A1 | 12/2000 |
| WO | WO 2009065587 A1 * | 5/2009 |
| WO | WO 2009068107 A1 * | 6/2009 |
| WO | WO 2009/103635 A1 | 8/2009 |
| WO | WO 2010/003818 A2 | 1/2010 |

OTHER PUBLICATIONS

International Search Report mailed Sep. 21, 2010 in PCT/ES2010/070379 filed Jun. 8, 2010 (in English).

* cited by examiner

*Primary Examiner* — David Bryant
*Assistant Examiner* — Ruth G Hidalgo-Hernande
(74) *Attorney, Agent, or Firm* — Oblon, Spivak, McClelland, Maier & Neustadt, L.L.P.

(57) ABSTRACT

The method comprises the manufacture of a front section (2) and an rear section (3) with an assembly structure integrated into the rear section and the subsequent assembly of the two sections.
The manufacture of the front section (2) comprises the manufacture of a main portion (9) of the front section separated from a coupling portion (10) of the front section.
The assembly of the two sections comprises the assembly of the main portion (9) with the group comprising of the rear section assembly (3) and the coupling portion (10) of front section.

12 Claims, 5 Drawing Sheets

A-A'

B-B'

C-C'

METHOD FOR ASSEMBLING FUSELAGE SECTIONS OF AN AIRCRAFT

OBJECT OF THE INVENTION

The present invention is designed for the aeronautic industry in the field of aircraft design and construction.

OBJECT OF THE INVENTION

The object of the present invention, as stated in the description of the present specification, is a method for assembling aircraft fuselage sections.

The invention provides a procedure making it possible to assemble prefabricated fuselage sections with maximum integrity, which reduces the number of operations necessary for performing the assembly and to therefore lower the manufacturing costs and times. Additionally, the integral or quasi-integral fabrication of each one of the sections prior to assembling them, provides improvements in the structural sturdiness and the dimensional precision of the sections proper, additionally taking into account that for the fabrication of each one of the sections to be assembled with the maximum integrity, the use of manufacturing techniques employing composite materials known as fiber placement.

For the coupling of fuselage sections, assembly structures are used comprising an assembly frame and a buttstrap, which extend around the fuselage around the edge of the sections to be assembled. The assembly frame must absorb the loads coming from the sections in addition to transversally rigidizing the fuselage in the area of the coupling. On the other hand, the buttstrap has the function of assuring the continuity of the forces transferred through the skin and the stringers of each one of the sections to be coupled.

In particular, the present invention provides a method for assembling the sections where the pressure bulkhead of the aircraft is located. That is to say, the sections corresponding respectively to the pressurized area and the unpressurized area of the aircraft. In addition to the aforementioned assembly frame and flange-plate, the assembly structure of these sections requires structural modifications for coupling the bulkhead, on the configuration of the assembly frame proper or by means of the inclusion of additional structural elements for the purpose of providing added strength adequate for absorbing the pressure loads which act on the pressure bulkhead.

The object of the present invention is also to provide a method for assembling the two sections when the assembly structure (frame, buttstrap, coupling of the pressure bulkhead, etc.) has been previously integrated into the rear section. In this case, integrating the assembly structure into the aft section provides the technical advantage of that, on positioning the assembly structure further rear, the pressure bulkhead is also moved noticeably aftward, therefore noticeably increasing the volume of the pressurized area of the aircraft with the resulting advantage stemming from the increase in the capacity to transport payload.

Lastly, another object of the present invention is to provide a procedure for assembling the two sections when the fuselage is troncoconical. In this case, if the assembly structure (consisting at least of the assembly frame and the buttstrap) is additionally incorporated into the rear section, the technical problem arises, on part of the assembly structure (at least the buttstrap) extending beyond the edge of the rear section, of it not being possible, by geometry, to directly couple the rear section to the front section.

STATE OF THE ART PRIOR TO THE INVENTION

Conventionally, the assembling of fuselage sections is not done starting from the fully integrated sections. At least the assembly structure (assembly frame, buttstrap, etc.) is installed afterward, during the assembly operation proper. Once the assembly structure is secured in place, the skin is extended over it, distributed into panels. This conventional method provides the advantage of making it possible to correct the manufacturing tolerances by allowing for an adequate final adjustment between the two sections to be coupled, this however entailing drawbacks, as previously stated, resulting from the manufacturing time and costs, as well as the structural sturdiness and dimensional precision of the fuselage in the region surrounding the assembly area, with regard to the solution of coupling the sections starting from their incorporating the assembly structure prior to the assembling process.

In addition thereto, in the case of the present invention the factor is involved of the incorporation of the structural elements for coupling the pressure bulkhead to the assembly structure proper. Conventionally, the pressure bulkhead is assembled to the aircraft by way of the assembly frame proper. For this purpose, one rear portion of the upper wing of the frame projects upward and back, on a certain slant from the skin which is determined by a line tangent to the pressure bulkhead, having an approximate value, as a guideline, of 60°. Reinforcement structures for the bulkhead pressure load, such as stays which are connected between the assembly frame and on another reinforcement frame arranged in a position aftward of the assembly frame and connected to the stringers of the rear section are also known. This assembly frame for pressure bulkhead necessarily has to be made of metal by way of machining technology, due to the nature of the loads it must withstand, those of the coupling as a single assembly frame plus the pressure loads. However, pressure bulkhead assembly structures which can be fabricated completely in composite material have recently been considered. This fact makes it possible to obtain an assembly structure jointed to the fuselage section without any mechanical means of attachment being necessary, for example, by means of the composite cobonding or cocuring technologies, which contributes positively to the object of the present invention. This assembly structure is included in the present invention and is that toward which it is preferably aimed.

DESCRIPTION OF THE INVENTION

For the purpose of providing a solution to the drawbacks of the state of the art and achieving the aforementioned improvements, the present invention provides a method for assembling fuselage sections suitable for troncoconical fuselage sections where the pressure bulkhead of the aircraft is assembled.

Essentially, the assembling method makes it possible to couple a front section to a rear section of the fuselage, when one of the sections previously incorporates the assembly structure. Said assembly structure comprises an assembly frame and a main buttstrap. On the other hand, the sections incorporate stringers, skin and shape frames.

The method is characterized in that the fabrication of the front section comprises the fabrication thereof divided into two portions: a main portion of front section and a rear coupling section portion. The coupling portion consists of a portion of the front section which extends from the edge encompassing or covering an arc. Thus, the main portion of front section is defined by a front edge, a rear edge and a transversal edge which extends between the aforesaid front section front and rear edges.

Apart from the above, the fabrication of the rear section comprises the incorporation of the assembly structure in said section, that is to say, the incorporation of the main buttstrap and the assembly frame therein. Hence, the main buttstrap is connected securely to the skin, and the assembly frame is coupled securely to said main buttstrap.

The assembling of the two sections is completed by way of the following sub-stages:
  assembling of the main portion to the rear section; and
  assembling of the coupling portion to the assembly of the main portion and the rear section.

Thus, the invention makes it possible to assemble the troncoconical sections of the fuselage, from sections of maximum integrity, despite the assembly structure being previously integrated into the rear section to be coupled. Given that this makes the independent assembling of the portions into which they are subdivided possible by bringing the corresponding portions and sections closer to one another until they come into contact with one another.

Section or "integrated" structure are understood in the present invention as the technical elements comprising said section or structure being securely connected prior to the coupling process. In particular, the assembly structure integrated into the section is understood as the assembly structure being securely connected to the section prior to the process of coupling to the other section taking place. To securely connect the different elements of the assembly structures and the assembly structure to the section, both means of attachment as well as connecting means are included. The means of attachment are distinguished from the connecting means in that the means of attachment required connecting elements different from the elements to be connected. The means of attachment can be mechanical (threaded, such as bolts; or unthreaded, such as blind or non-blind rivets) or chemical (such as adhesives, by bonding or by cobonding; by cobonding when the parts to be connected are made of a composite material). The connecting means, in turn, can be mechanical (such as, by grooving and tonguing) or chemical (such as by cocuring, when the parts to be connected are made of a composite material). The difference between the cocuring and cobonding techniques is as follows: In cocuring, elements which have not previously been cured are joined together, the union resulting from the curing of the assembly of the two elements, no adhesive being placed between the elements to be joined together; however, in cobonding, one of the elements to be connected has been previously cured, a layer of adhesive being placed between the elements to be joined together.

One variation on the assembling procedure described hereinabove is that the coupling portion be integrated into the front section (or even that it comprises part thereof). The advantage of this alternative lies in the lesser number of parts to be assembled, although it would entail the drawbacks as regards the preceding alternative of the implement for fabricating the skin would be more complex and it would allow for a lesser degree of flexibility for correcting dimensional tolerances in the adjustment of the sections to be coupled. In this regard, taking into account these effects, the present invention alternatively includes that the coupling portion be divided, in turn, into various portions, of that it extend around the assembly area in discontinuous segments, so as to make it possible to optimize said adjustment of the final coupling between the integrated or "quasi-integrated" sections. The term "quasi-integrated" is understood as being the section without the corresponding coupling portion integrated therein.

For assembling the quasi-integrated to the coupling portion, the incorporation of a secondary buttstrap which is integrated into the front section for connecting the coupling portion to the front edge is included. Similarly, a transversal buttstrap is placed on the transversal edge of the main portion for connecting the same to the coupling portion. The secondary buttstrap is conventionally coupled to the last shaping frame of the front section, such as to ensure at all times the continuity of the structural sturdiness in the area of connection between the portions by means of the incorporation of tension fittings which connect the buttstraps to the corresponding stringers.

BRIEF DESCRIPTION OF THE FIGURES

To complement the description of the invention and for the purpose of aiding toward a better comprehension of the design features thereof, the following figures are attached to this specification.

Figure 1:
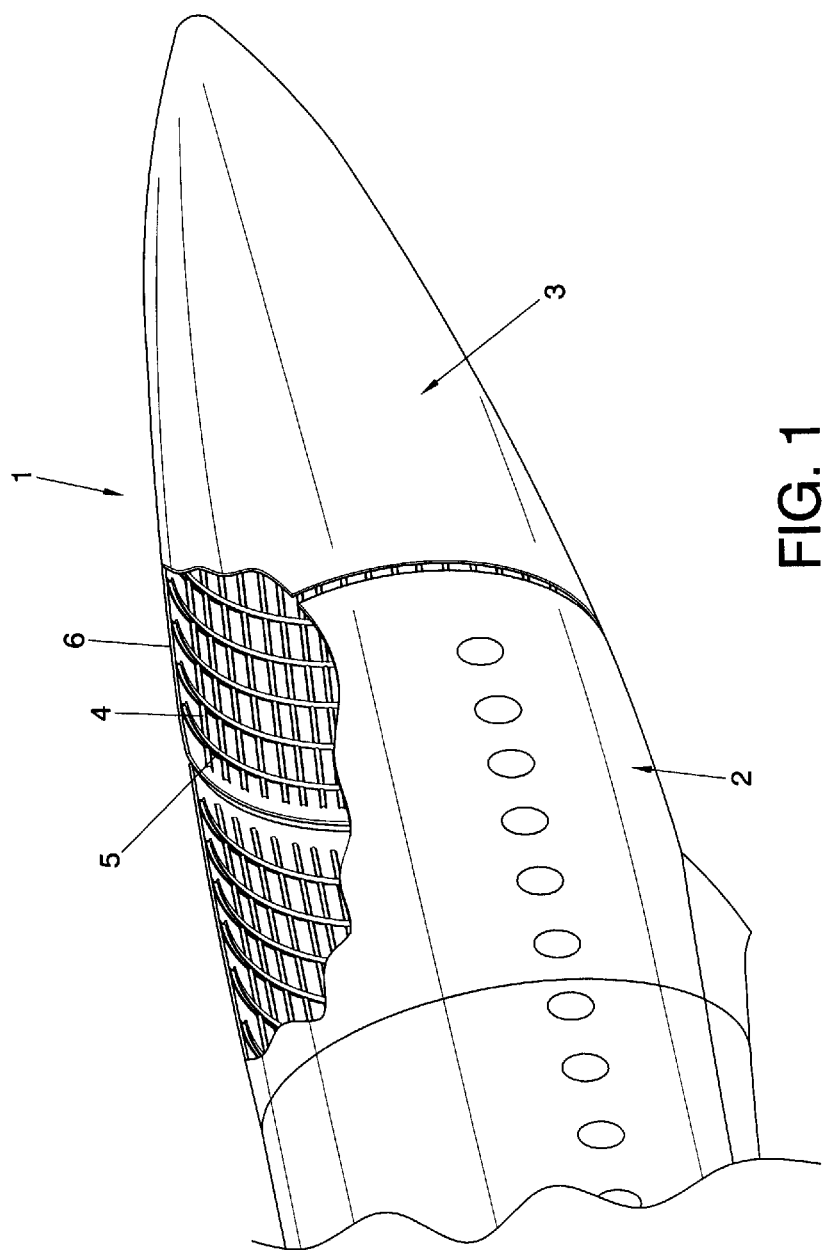
FIG. 1. Schematic perspective view of an aircraft fuselage showing the structure thereof in the area where the front and rear sections are assembled.

The references used in the figures are as follows:
1: Aircraft fuselage
2: Front fuselage section
3: Rear fuselage section
4: Stringer
5: Shape frame
6: Skin
7: Main buttstrap
8: Assembly frame
9: Main portion of front section
10: Coupling portion of front section
11: Secondary buttstrap
12: Tension fittings
13: Pressure bulkhead
14: Bulkhead ring
15: Transversal buttstrap
16: Rear edge of main portion
17: Front edge of main portion
18: Anchoring for hoisting rear section

DESCRIPTION OF A PREFERRED EMBODIMENT

The preferred embodiment described in following relates to a method for assembling the front section (2) and rear section (3) of the troncoconical fuselage (1) of an aircraft, the sections to be assembled being those corresponding to the coupling of the pressure bulkhead of the aircraft. FIG. 1 provides a view of the aforesaid sections, showing the structural elements of the sections to be assembled, which comprise stringers (4), shape frames (5) and skin (6).

Prior to assembling the sections, the assembly structure is integrated into the rear section (3) of the fuselage (1).

The assembly structure entailed in this preferred embodiment can be fabricated completely in composite material, contributing positively to the object of the present invention as has been previously stated. This assembly structure, which is integrated into the rear section prior to performing the coupling, comprises a main buttstrap (7), an assembly frame (8), tension fittings (12), the pressure bulkhead (13) and a rim angle (14). These elements are shown for example in FIG. 3, corresponding to a cross-sectional view of the assembly structure, which extends cylindrically and symmetrically around the fuselage. The rim angle (14) has the function of receiving the pressure loads of the pressure bulkhead (13). It is characterized in that it is "L"-shaped, with two straight portions: on front portion and another rear portion. Thus, the bulkhead (14) is connected to the rear section of the rim angle (14), the rear section projecting upward and backward on a certain slant to the skin (6), the slant being determined by a line tangent to the pressure bulkhead. Apart therefrom, the assembly frame (8) has the function of rigidizing the transversal section of the fuselage, in a manner unattached to the function of absorbing the pressure loads of the bulkhead (13), which is provided by the rim angle (14). The frame (8) is securely connected to the rim angle (14) and, the frame and rim assembly are securely connected to the skin by placing the main buttstrap (7) in between, between the front portion of the rim angle and the skin. Apart therefrom, the main buttstrap (7) is connected to the stringers (4) of the rear section by means of some tension fittings (12). With this configuration, at least the main buttstrap extends beyond the rear section (3), prior to proceeding to assembling the main portion (9) or the coupling portion (10) of the front section (2) with said rear section (3).

Figure 2A:
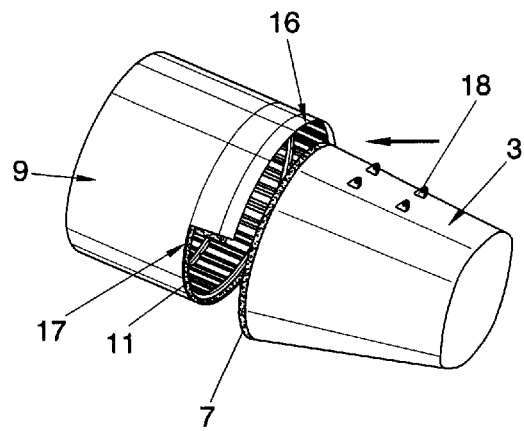
FIG. 2A shows the rear section being brought up to the main section of the front section, prior to their coupling.
Figure 2B:
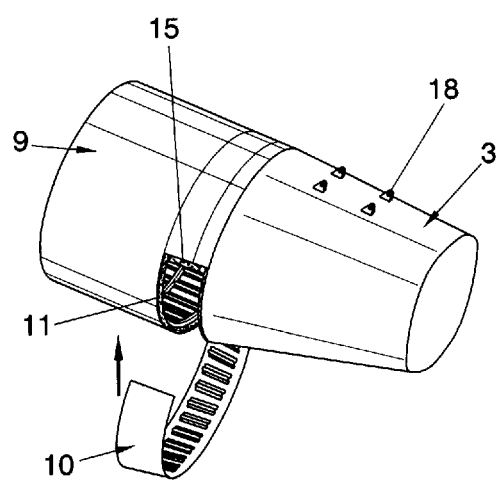
FIG. 2B shows the coupling portion being brought up to the assembly of the rear section with the main portion. And Figure C shows the fuselage with the two sections now assembled.
Figure 2C:
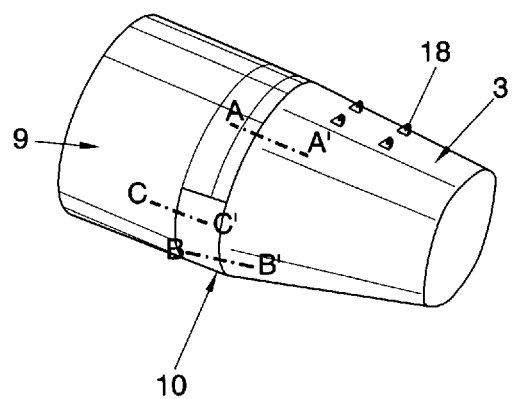
FIG. 2. Schematically shows the method for assembling the front and rear sections of the fuselage of the preferred embodiment of the invention.

FIG. 2 schematically shows the assembling method of the invention. Thus, FIG. 2$^a$ shows the assembling of the rear section (3) with the main portion (9) of the front section (2), showing the rear section being brought up to the main portion. FIG. 2B shows the assembling between the coupling portion (10) and the assembly of the main portion (9) of front section assembled to the rear section (3). A transversal buttstrap (15) is placed on the transversal edge of the main portion (9) for connecting the main portion (9) to the coupling portion (10). Lastly, FIG. 2C shows the fuselage once the sections are assembled.

Figure 3:
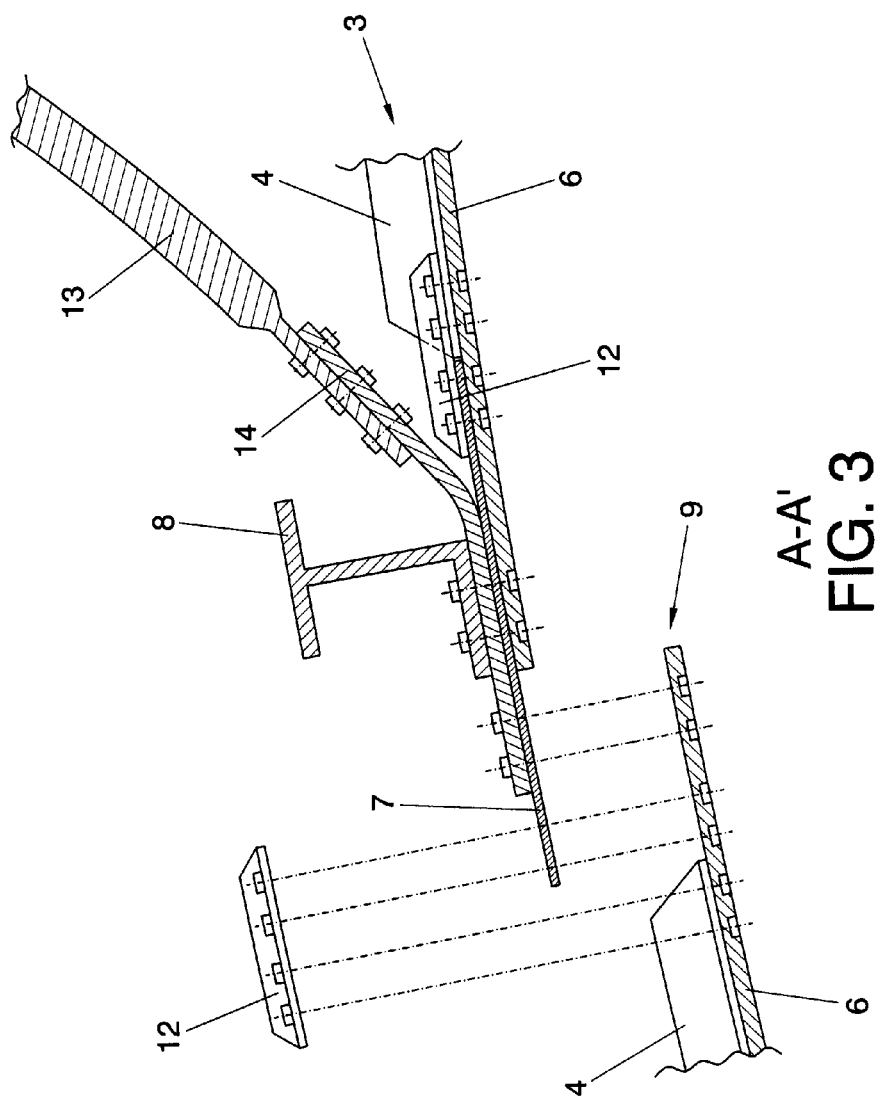
FIG. 3. Shows the assembling between the front and rear section of the fuselage according to the view shown in FIG. 2C as A-A'.
Figure 4:
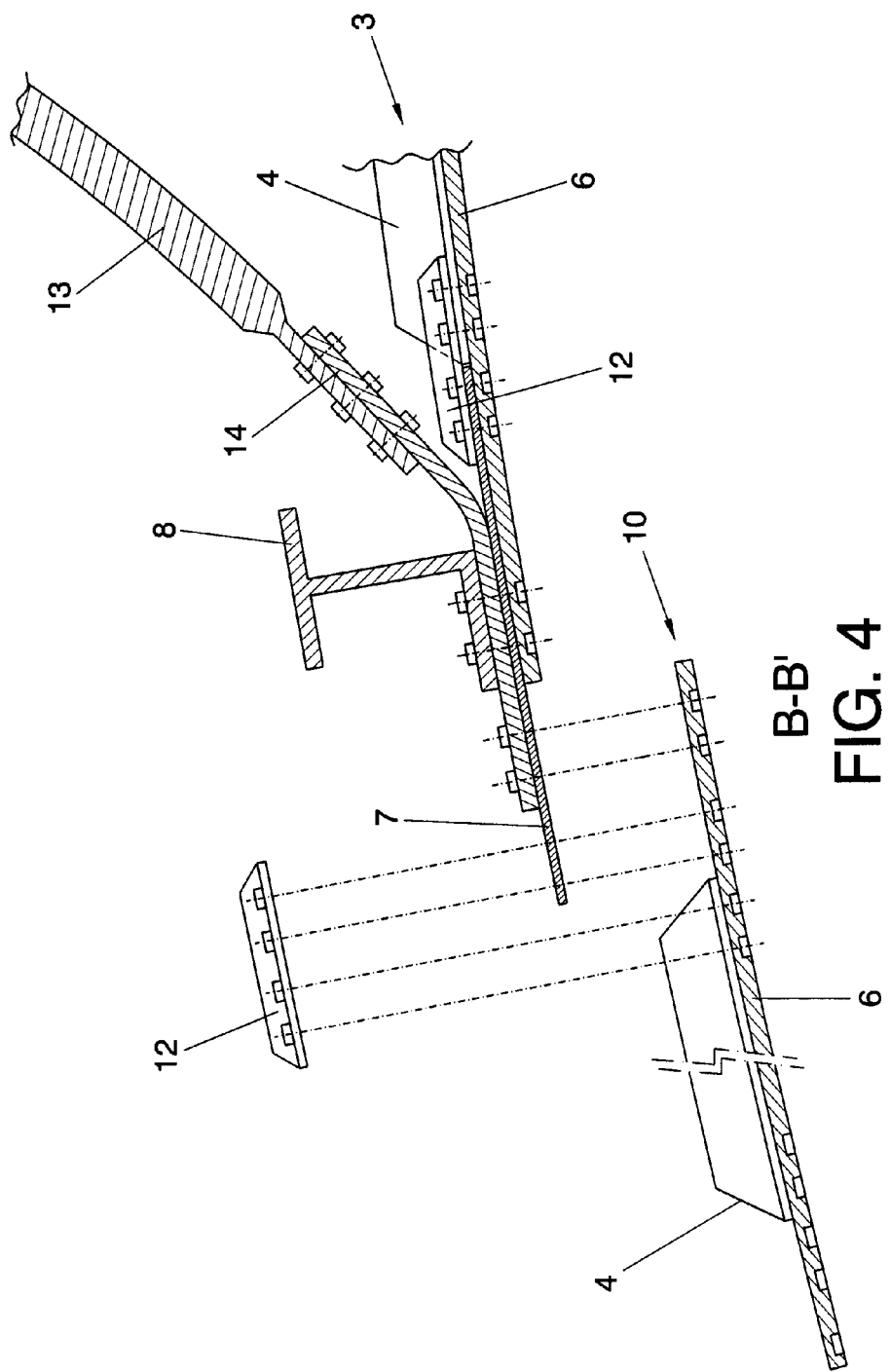
FIG. 4. Shows the assembling between the front and rear section of the fuselage according to the view shown in FIG. 2C as B-B'.
Figure 5:
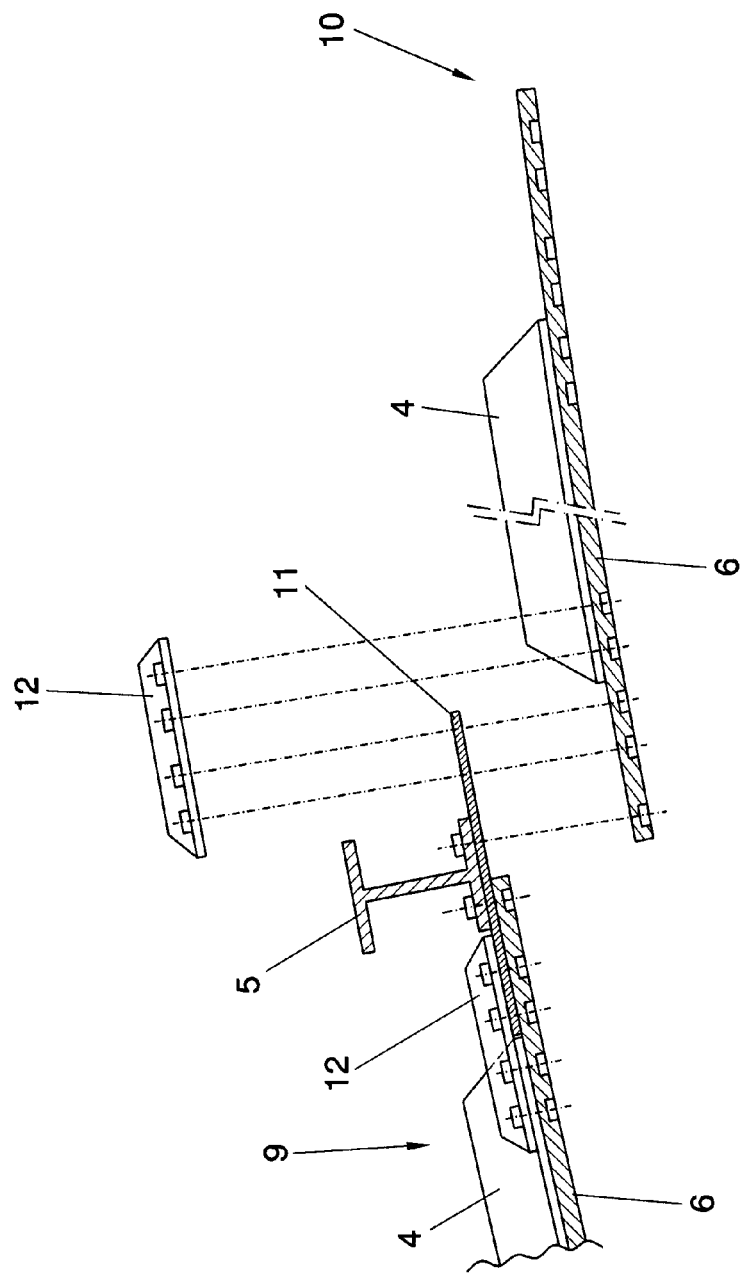
FIG. 5. Shows the assembling between the front and rear section of the fuselage according to the view shown in FIG. 2C as C-C'.

Internally, the assembling of the portions and sections is shown in FIGS. 3, 4 and 5, which shows the assembling according to cross-sectional views A-A', B-B' and C-c' of Figure C, respectively. Thus, FIG. 3 (view A-A') shows the assembling between the rear section (3) and the main portion (9); FIG. 4 (view B-B') showing the assembling between the rear section (3) and the coupling section (10); and FIG. 5 (view C-C') shows the assembling between the main portion (9) having the secondary buttstrap (11) and the coupling portion (10).

During the assembling, the sections are supported by means of stands or gantry cranes. To facilitate bringing the sections together during the assembling, the sections can incorporate some anchorings (18) to allow them to be hoisted.

The invention claimed is:

1. A method for assembling fuselage sections of an aircraft, to couple a front section to a rear section of the fuselage; the sections comprising stringers, shape frames and skin; the fuselage comprising an assembly structure between the front section and the rear section; the assembly structure including a main buttstrap and an assembly frame, the method comprising:
    manufacturing the front section which includes the manufacture of a main portion of the front section and a coupling portion which consists of a portion of the front section which extends from a front edge encompassing an arc, wherein the main portion is defined by the front edge, a rear edge and a transversal edge extending between the front edge and the rear edge and is separated from the coupling portion; wherein the transversal edge includes a transversal buttstrap to connect the main portion of the front section to the coupling portion; and
    manufacturing the rear section which includes the integration of the assembly structure into the rear section;
    assembling of the main portion of the front section to the rear section; and
    assembling of the coupling portion to each of the main portion of the front section and the rear section.

2. A method for assembling fuselage sections of an aircraft, to couple a front section to a rear section of the fuselage; the sections comprising stringers, shape frames and skin; the fuselage comprising an assembly structure between the front section and the rear section; the assembly structure including a main buttstrap and an assembly frame the method comprising:
    manufacturing of the front section and of the rear section with the assembly structure integrated into one of the sections; and
    assembling of the sections;
    wherein the manufacture of the front section includes the manufacture of a main portion of the front section and a coupling portion which consists of a portion of the front section which extends from a front edge encompassing an arc, wherein the main portion of the front section is defined by the front edge, a rear edge and a transversal edge extending between the front edge and the rear edge and is separated from the coupling portion; wherein the transversal edge includes a transversal buttstrap to connect the main portion of the front section to the coupling portion;
    the manufacture of the rear section includes the integration of the assembly structure into the rear section; and
    the assembly of the two sections includes the assembly of the main portion of the front section to the rear section and the coupling portion.

3. The method for assembling fuselage sections of an aircraft, according to claim 1 or 2, wherein the manufacture of the main portion of front section includes the incorporation of a secondary buttstrap which extends along the front edge of the front section; the secondary buttstrap being securely connected between a shape frame and the skin of the front section.

4. The method for assembling fuselage sections of an aircraft, according to claim 3, wherein the manufacture of the main portion of the front section includes the incorporation of tension fittings securely connected between the stringer.

5. The method for assembling fuselage sections of an aircraft, according to claim 4, wherein the manufacture of the coupling portion includes the incorporation of stringers securely connected to the skin.

6. The method for assembling fuselage sections of an aircraft, according to claim 5, wherein the manufacture of the rear section includes the incorporation of a pressure bulkhead securely coupled to the assembly frame and to the main buttstrap.

7. The method for assembling fuselage sections of an aircraft, according to claim 6, wherein the pressure bulkhead is securely connected to a ring bulkhead which is securely connected, in turn, between the assembly frame and the main buttstrap.

8. The method for assembling fuselage sections of an aircraft, according to claim 5, wherein the manufacture of the main portion of the front section includes the incorporation of a transversal buttstrap.

9. The method for assembling fuselage sections of an aircraft, according to claim 8, wherein the assembly of the main portion of the front section with the rear section includes securely connecting the main buttstrap to the skin of the main portion.

10. The method for assembling fuselage sections of an aircraft, according to claim 9, wherein the assembly of the main portion of the front section with the rear section includes securely connecting some tension fittings between the stringers of the main portion and the main buttstrap.

11. The method for assembling fuselage sections of an aircraft, according to claim 8, wherein the assembly of the coupling portion with the assembly of the main portion of the front section and the rear section includes securely connecting the skin of the coupling portion with the main buttstrap of the rear section and with the secondary buttstrap and the transversal buttstrap of the front section.

12. The method for assembling fuselage sections of an aircraft, according to claim 11, wherein the assembling of the coupling portion with the main portion of the front section and the rear section includes securely connecting some tension fittings between the stringers of the coupling portion and the main buttstrap on one hand, and between the stringers of the coupling portion and the secondary buttstrap, on the other.

\* \* \* \* \*